US010482876B2

(12) United States Patent
Selfridge et al.

(10) Patent No.: US 10,482,876 B2
(45) Date of Patent: Nov. 19, 2019

(54) HIERARCHICAL SPEECH RECOGNITION DECODER

(71) Applicant: Interactions LLC, Franklin, MA (US)

(72) Inventors: Ethan Selfridge, Jamaica Plain, MA (US); Michael Johnston, New York, NY (US)

(73) Assignee: Interactions LLC, Franklin, MA (US)

( * ) Notice: Subject to any disclaimer, the term of this patent is extended or adjusted under 35 U.S.C. 154(b) by 0 days.

(21) Appl. No.: 16/148,884

(22) Filed: Oct. 1, 2018

(65) Prior Publication Data

US 2019/0035389 A1 Jan. 31, 2019

Related U.S. Application Data

(63) Continuation of application No. 15/131,833, filed on Apr. 18, 2016, now Pat. No. 10,096,317.

(51) Int. Cl.
| | | |
|---|---|---|
| *G06F 17/27* | (2006.01) | |
| *G10L 15/197* | (2013.01) | |
| *G10L 15/02* | (2006.01) | |
| *G10L 15/06* | (2013.01) | |

(52) U.S. Cl.
CPC ............ *G10L 15/197* (2013.01); *G10L 15/02* (2013.01); *G10L 15/063* (2013.01); *G10L 2015/0631* (2013.01)

(58) Field of Classification Search
CPC .............................. G06F 17/27; G06F 17/2785
See application file for complete search history.

(56) References Cited

U.S. PATENT DOCUMENTS

| | | | |
|---|---|---|---|
| 6,393,389 B1 * | 5/2002 | Chanod ................. | G06F 17/271 704/4 |
| 6,550,057 B1 | 4/2003 | Bowman-Amuah | |
| 6,601,192 B1 | 7/2003 | Bowman-Amuah | |
| 6,615,253 B1 | 9/2003 | Bowman-Amuah | |
| 6,876,930 B2 * | 4/2005 | Murray ................. | G16B 50/00 702/19 |

(Continued)

OTHER PUBLICATIONS

PCT International Search Report and Written Opinion, PCT Application No. PCT/US2017/027062, dated Sep. 20, 2017, 15 pages.

(Continued)

*Primary Examiner* — Michael N Opsasnick
(74) *Attorney, Agent, or Firm* — Fenwick & West LLP

(57) ABSTRACT

A speech interpretation module interprets the audio of user utterances as sequences of words. To do so, the speech interpretation module parameterizes a literal corpus of expressions by identifying portions of the expressions that correspond to known concepts, and generates a parameterized statistical model from the resulting parameterized corpus. When speech is received the speech interpretation module uses a hierarchical speech recognition decoder that uses both the parameterized statistical model and language sub-models that specify how to recognize a sequence of words. The separation of the language sub-models from the statistical model beneficially reduces the size of the literal corpus needed for training, reduces the size of the resulting model, provides more fine-grained interpretation of concepts, and improves computational efficiency by allowing run-time incorporation of the language sub-models.

20 Claims, 5 Drawing Sheets

TRAINING

(56) References Cited

U.S. PATENT DOCUMENTS

| | | |
|---|---|---|
| 8,676,937 B2* | 3/2014 | Rapaport ................ H04L 51/32 |
| | | 709/219 |
| 8,996,555 B2 | 3/2015 | Kuchmann-Beauger et al. |
| 2005/0005266 A1 | 1/2005 | Datig |
| 2007/0219933 A1 | 9/2007 | Datig |
| 2010/0205541 A1* | 8/2010 | Rapaport ............... G06Q 10/10 |
| | | 715/753 |
| 2011/0191107 A1* | 8/2011 | Abrego ................ G10L 15/193 |
| | | 704/257 |
| 2014/0201126 A1* | 7/2014 | Zadeh ................... G06N 7/005 |
| | | 706/52 |
| 2014/0279906 A1 | 9/2014 | Peintner |
| 2014/0358544 A1* | 12/2014 | Printz .................... G10L 15/19 |
| | | 704/254 |
| 2014/0380285 A1 | 12/2014 | Gabel et al. |
| 2015/0186504 A1* | 7/2015 | Gorman ............ G06F 16/24522 |
| | | 707/752 |
| 2015/0348541 A1* | 12/2015 | Epstein ................ G10L 15/063 |
| | | 704/257 |

OTHER PUBLICATIONS

United States Office Action, U.S. Appl. No. 15/131,833, dated Aug. 10, 2017, 10 pages.
United States Office Action, U.S. Appl. No. 15/131,833, dated Jan. 4, 2018, 9 pages.

* cited by examiner

TRAINING

RUNTIME

HIERARCHICAL SPEECH RECOGNITION DECODER

CROSS-REFERENCE TO RELATED APPLICATIONS

This application is a continuation of U.S. application Ser. No. 15/131,833, filed on Apr. 18, 2016, now U.S. Pat. No. 10,096,317, issued on Oct. 9, 2018, the contents of which is incorporated herein by reference in its entirety.

FIELD OF ART

The present invention generally relates to the field of computer-aided speech processing, and more specifically, to expanding recognition capability of a speech-processing system while improving run-time efficiency of speech model adaptation and reducing the amount of model training data required.

Field of Classification: 704/1, 704/4, 704/9, 704/10

BACKGROUND

Speech recognition systems are specialized computers that are configured to process and recognize human speech and may also take action or carry out further processes. Developments in speech recognition technologies support "natural language" type interactions between automated systems and users, allowing a user to speak naturally, e.g., when providing commands to a computer application.

An important component of a speech recognition system is the language model. The language model indicates the set of speech inputs that the system can recognize, as well as data that is used to guide the mapping from speech input to words. For example, one particular language model might indicate that the phrase "Send a text to John and Fred" is a valid speech input, but the phrase "Text send and Fred" is not.

It is desirable for the language model to have a number of properties. For example, the language model should support the recognition of data specific to a context, such as specific names. At the same time, the language model should be efficient, such as requiring little data to build the model, supporting rapid runtime incorporation of context specific information, and limit resources required such as CPU and memory. Unfortunately, achieving some of the desired properties tends to make achieving others more difficult. For example, supporting data specific to a context tends to require acquisition of more data and retraining to build accurate models for that context.

SUMMARY

In one embodiment, a computer-implemented method for producing user-specific interpretations of user utterances comprises accessing a literal speech recognition corpus comprising a plurality of expressions; accessing a concept tagging module for identifying instances of a plurality of concepts within an expression; generating a parameterized speech recognition corpus by applying the concept tagging module to the expressions of the literal speech recognition model corpus in order to identify, within the expressions, portions of the expressions that are instances of the concepts; generating, by the voice server, a parameterized statistical model based on the parameterized speech recognition model corpus, the parameterized statistical model indicating a plurality of probability scores for a corresponding plurality of n-grams, some of the plurality of n-grams including a placeholder indicating one of the plurality of concepts; accessing, by the voice server, a plurality of language sub-models corresponding to the plurality of concepts, at least some of the plurality of language sub-models being customized for a user; receiving, by the voice server over a computer network, an utterance of the user; and generating, by the voice server, a user-specific interpretation of the utterance using both the parameterized statistical model and ones of the plurality of language sub-models corresponding to instances of the concepts in the utterance.

In one embodiment, a computer-implemented method comprises accessing a literal corpus comprising a plurality of expressions; accessing a concept tagging module for identifying instances of a plurality of concepts within an expression; generating a parameterized speech recognition corpus by applying the concept tagging module to the expressions of the literal speech recognition model corpus in order to identify, within the expressions, portions of the expressions that are instances of the concepts; and generating a parameterized statistical model based on the parameterized speech recognition model corpus.

In one embodiment, a non-transitory computer-readable storage medium stores instructions executable by a computer processor, the instructions comprising instructions for accessing a literal corpus comprising a plurality of expressions; instructions for accessing a concept tagging module for identifying instances of a plurality of concepts within an expression; instructions for generating a parameterized speech recognition corpus by applying the concept tagging module to the expressions of the literal speech recognition model corpus in order to identify, within the expressions, portions of the expressions that are instances of the concepts; and instructions for generating a parameterized statistical model based on the parameterized speech recognition model corpus.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
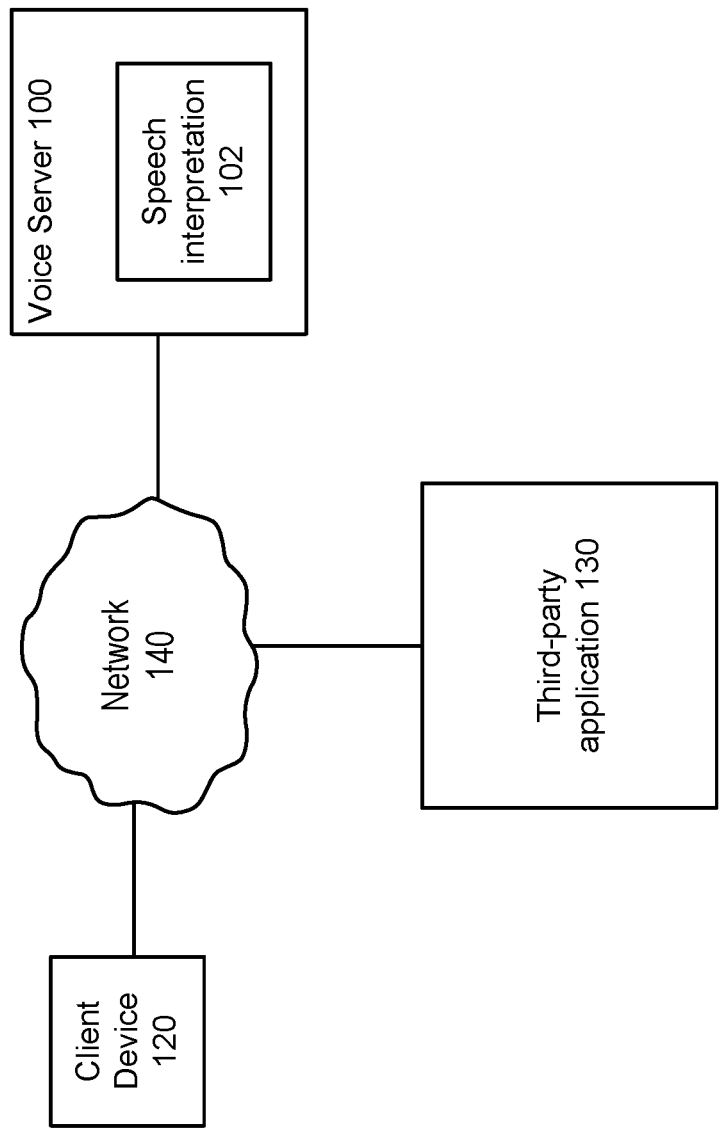
FIG. 1 illustrates an environment in which speech recognition takes place, according to one embodiment.

FIG. 1 illustrates an environment in which speech processing takes place, according to one embodiment. Users use their client devices 120 to provide "utterances"—spoken input, such as queries for information (e.g., "When is the next Discount Airways flight arriving"), or commands to be executed by applications (e.g., "Send a text to John and Fred").

In the embodiment illustrated in FIG. 1, the client devices 120 provide the spoken input over a computer network 140, such as the Internet, to a voice server 100, which performs the interpretation of the spoken input using a speech interpretation module 102 in order to determine the meaning of the utterance. The providing of the utterance may be direct or indirect. For example, an application of the client device 120 may provide the utterance directly to the voice server 100, receiving and using an interpretation of the utterance that the voice server 100 produces. Alternatively, the client device 120 may provide the utterance to a third-party application 130 (e.g., a cloud-based application or service), which in turn relays the utterance to the voice server 100 for interpretation, and the third-party application receives and uses the resulting interpretation. The speech interpretation module 102 is described in more detail below with respect to FIG. 2.

The client devices 120 are computing devices such as smart phones, laptop computers, desktop computers, or any other device that can accept spoken input from a user and provide the spoken input to the voice server 100 over the computer network 140.

The computer network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

It is appreciated that although for the sake of simplicity only one client device 120, third-party application 130, and voice server 100 are illustrated, there could be any number thereof. Additionally, in some embodiments the speech interpretation module 102 is implemented partially or entirely on systems other than the voice server 100, such as on the client device 120 or on systems providing the third-party application(s) 130.

Figure 2:
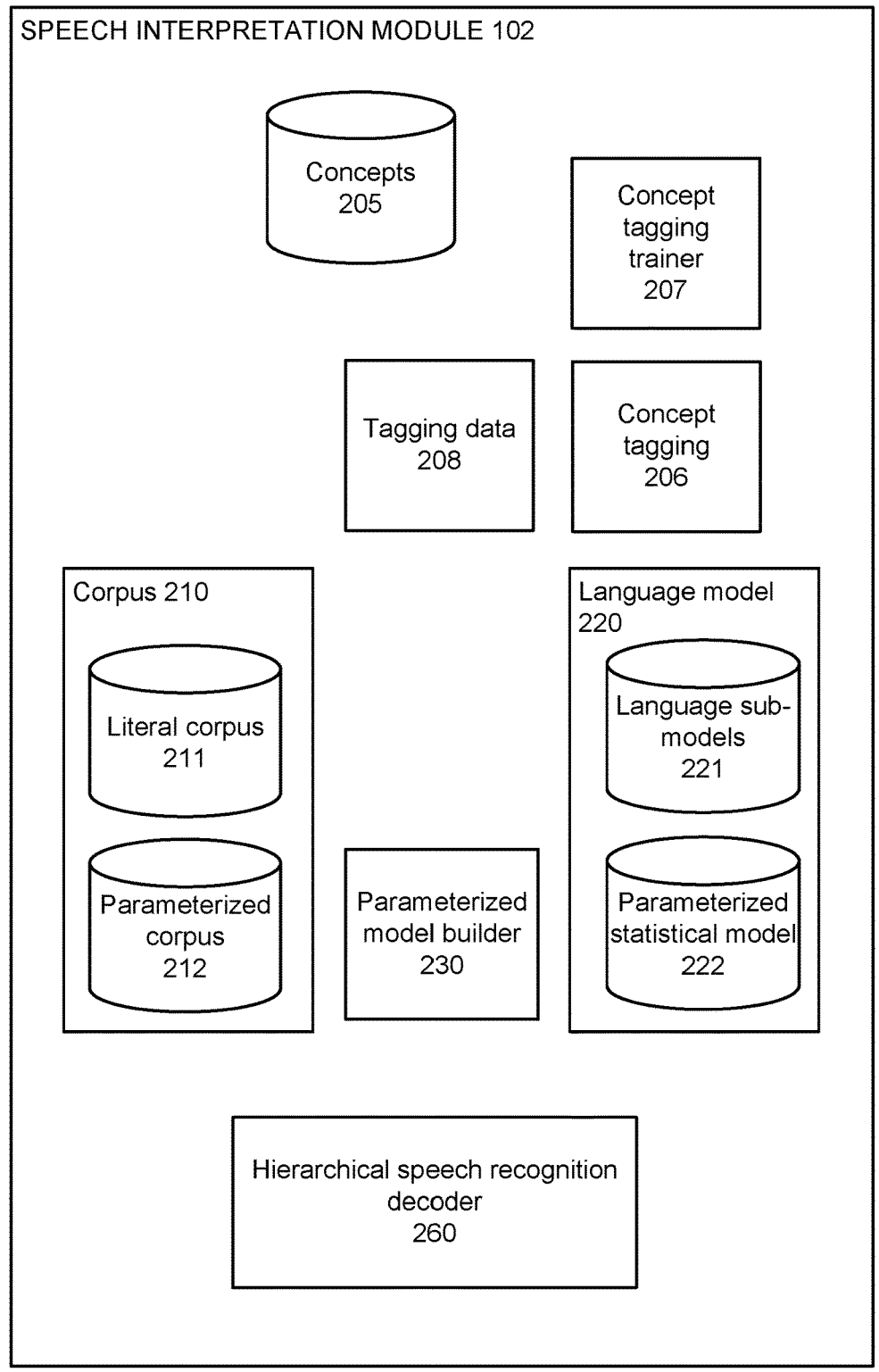
FIG. 2 is a block diagram illustrating the various components of the speech interpretation module of FIG. 1, according to one embodiment.

FIG. 2 is a block diagram illustrating the various components of the speech interpretation module 102 of FIG. 1, according to one embodiment.

The speech interpretation module 102 stores, or has access to, training data that it uses in a training phase to generate a specialized hybrid language model that represents a universe of possible utterances that a user could make. The speech interpretation module 102 uses a specialized speech recognition decoder at runtime that applies the language model to user utterances in order to assign meanings to the utterances.

More specifically, the speech interpretation module 102 includes a corpus 210 that stores expressions from which a statistical language model is trained for recognizing utterances. The corpus 210 includes a literal corpus 211 that contains literal expressions, such as "Send a text to John and Fred", "When is the next Discount Airways flight arriving?", "I want to speak to a customer representative", and the like.

Many variants of literal expressions may also be valid, given that components of the literal expressions may represent just one of many possible instances of a concept. Referring to the above example literal expression "Send a text to John and Fred", for instance, the literal expression is an instance of the more generally applicable concept of sending a text from one person to another person; "John" and "Fred" are not the only names that can validly be recognized in such an expression. For example, a particular user's address book might contain the names "Christian König" and "Amber Lee", so for that person, the speech interpretation module 102 should also be able to recognize the sentence "Send a text to Christian König and Amber Lee." Similarly, the expression "When is the next Discount Airways flight arriving" is an instance of the more generally applicable query asking for a time of arrival of a flight from a particular airline, and the speech interpretation module 102 should be able to recognize expressions containing names of airlines other than "Discount Airways".

Accordingly, the corpus 210 further includes a parameterized corpus 212 that generalizes the literal corpus 211 by containing parameterized representations of certain broadly-applicable concepts within the phrases of the literal corpus 211, such as names of people, names of airlines, particular types of commands or other actions, and the like. Thus, instead of (or in addition to) containing the expressions "Send a text to John and Fred" and "When is the next Discount Airways flight arriving" as in the literal corpus 211, the parameterized corpus 212 might contain the expression "Send a text to <PERSON_NAME> and <PERSON_NAME>" and "When is the next <AIRLINE_NAME> flight arriving", where <PERSON_NAME> and <AIRLINE_NAME> are placeholders respectively representing the name of a person and the name of an airline.

The speech interpretation module 102 stores identifiers of a set of concepts 205, representing the different types of concepts that can occur in expressions of the literal corpus 211 and be replaced with the placeholders of the parameterized corpus 212 in order to generalize the literal expressions. Continuing the example above, the concepts 205 would include identifiers of <PERSON_NAME> and <AIRLINE_NAME>, for instance, as well as identifiers of other possible concepts, such as <MONETARY_AMOUNT> (representing an expression of money, such as "56 dollars", or "5 pounds and two pence", <TIME> (representing expressions of time such as "eleven fifty two pm", or "fourteen hundred hours"), <DAY> (representing expressions of days, such as "Sep. 23, 2016", or "Groundhog Day"), <AUTOMOBILE_BRAND> (representing names of car brands), <FLIGHT_OPTION> (representing an option at a particular point menu level when interacting with an airline, such as getting arrival times, booking a flight, cancelling a flight, and the like), as just a few examples.

The speech interpretation module 102 includes a concept tagging module 206 that takes the literal corpus 211 as input and produces the parameterized corpus 212 as output. Specifically, the concept tagging module 206 identifies instances of the various concepts 205 within the literal corpus, replacing each instance with a placeholder indicating the identified concept class. For example, the concept tagging module 206 might transform the literal expression "Send a text to John and Fred" to the parameterized expression "Send a text to <PERSON> and <PERSON>", or the literal expression "Play Ninth Symphony by Beethoven" to the parameterized expression "Play <SONG> by <ARTIST>".

In one embodiment, the parameterized corpus 212 contains not only parameterized expressions with substituted placeholders of concepts, but also the original literal expressions. For example, in some embodiments the parameterized corpus 212 contains the literal expressions in which the concept tagging module 206 identified none of the concepts 205, and parameterized expressions for the literal expressions in which the concept tagging module did identify concepts and substitute placeholders for those concepts. In some embodiments, the parameterized corpus 212 additionally comprises the literal expressions, regardless of whether concepts 205 were identified within them. In some embodiments, the concept tagging module 206 determines whether to include in the parameterized corpus 212 the original literal expressions based on a corpus size threshold (e.g., if there are currently fewer than k entries in the parameterized corpus 212 for some integer k, then include the literal expressions as well; otherwise, do not), or on per-concept counts (e.g., include the literal expressions associated with a particular concept if the concept was identified in less than 10% of utterances in the corpus 212; otherwise omit the literal expressions associated with it), which serves to enact a balanced tradeoff between corpus size and corpus coverage.

In one embodiment, some set of expressions (e.g., a subset of the expressions of the literal corpus 211) are labeled tagged with the concepts that they represent. In this embodiment, the speech interpretation module 102 includes a concept tagging trainer module 207 that learns how to identify the various concepts 205 within literal expressions by analyzing the labeled expressions, generating tagging data 208 that the concept tagging module 206 can use to perform the tagging. The tagging data 208 may be of different types in different embodiments, such as a statistical model generated using conditional random fields, maximum entropy classification and Viterbi decoding, or hidden Markov models; a finite state tagging model; regular expressions or other forms of pattern matching; or data derived from unsupervised learning methods such as clustering phrases based on commonalities among the surrounding words. In such an embodiment, the concept tagging module 206 applies the tagging data 208 generated by the concept tagging trainer module 207 to identify the sub-expressions to be tagged within the literal expressions when producing the expressions of the parameterized corpus 212.

The speech interpretation module 102 further includes a parameterized model builder 230 that takes as input the parameterized corpus 212 and produces as output a parameterized model 222. Since the parameterized corpus 212 contains placeholders indicating instances of the various concepts 205, the parameterized model likewise is expressed partially in terms of instances of the concepts. In one embodiment, the parameterized model 222 includes probability scores indicating probabilities of occurrence of n-grams, for some integer n (e.g., 3-token trigrams for n=3), where each token of the n-gram can be either a literal word token or one of the placeholders for the concepts. For example, for an embodiment that analyzes trigrams, the parameterized model 222 might indicate that the trigram of literals "when is the" has a probability of occurrence of 0.0025, the trigram of literals "send text to" has a higher probability of occurrence of 0.008, and the trigram "text to <PERSON>" has a still higher probability of occurrence of 0.013.

In one embodiment, the parameterized model 222 also includes phoneme sequence probability scores indicating probabilities for the literal word tokens in the n-grams, although not for the concept placeholders, since the concepts may be expressed with different literal word tokens. The phoneme sequence probabilities allow analysis of the phonemes in the audio data of utterances, groups of which are mapped to individual possible word tokens, groups of which are in turn mapped to phrases.

The parameterized model 222 may be implemented in different manners in different embodiments. In some embodiments, for example, the parameterized model 222 is represented as a weighted finite state transducer, with the edges between states representing the different tokens (whether literal or concept placeholder) and their associated probabilities with respect to the current state.

The speech interpretation module 102 further includes a hierarchical speech recognition decoder 260 that takes the audio data for an utterance as input and interprets the utterance to produce interpretation output including one or more phrases that the utterance is most likely to represent. In different embodiments, the interpretation output of the hierarchical speech recognition decoder 260 includes (i) a single phrase calculated to be most likely to represent the utterance; (ii) a set of possible phrases, accompanied by their respective probabilities; or (iii) a phrase lattice/tree in which the nodes are individual literal word tokens and the edges between the nodes have weights indicating the probability that the corresponding literal word tokens occur in sequence, and the probability of a phrase in the lattice is computed by multiplying the weights on the edges along its corresponding path.

In one embodiment, the hierarchical speech recognition decoder 260 is implemented as a pushdown automaton that stores, at the top of an internal stack, an indication of the current type of expression or sub-expression to be matched. As the hierarchical speech recognition decoder 260 processes an utterance, the hierarchical speech recognition decoder pushes indications of language sub-models 221 onto the stack when the corresponding placeholders are encountered within an expression to be matched. Similarly, the hierarchical speech recognition decoder 260 pops the indications off the stack after the current language sub-model 221 is successfully matched. For example, the stack might indicate that the expression "Send a text to <PERSON>" is to be matched; after the literal tokens "Send a text to" are matched, an indication of a type corresponding to the placeholder <PERSON> might be pushed onto the stack, thereby indicating that the language sub-model 221 for <PERSON> should be applied. If <PERSON> is matched, its indication is then popped off the stack. The use of stack allows for arbitrary nesting of language sub-models 221 to be traversed by the hierarchical speech recognition decoder 260; that is, the language sub-models 221 may be arranged into a nested hierarchy of any level of depth and processed using the stack of the push-down automaton.

The operation of the hierarchical speech recognition decoder 260 is based on the parameterized statistical model 222 and on language sub-models 221. As discussed above, the parameterized statistical model 222 includes not only probabilities of occurrence of sequences of literal word tokens, but also probabilities of occurrence of sequences containing placeholders indicating concepts 205. In order to determine whether the utterance includes such concepts 205, the hierarchical speech recognition decoder 260 additionally takes as input or otherwise incorporates a set of language sub-models 221 corresponding to the different possible concepts 205. (Returning to the above example, the parameterized statistical model 222 might include the trigram "text to <PERSON_NAME>" along with an associated estimated probability of occurrence of 0.0013. To determine whether a relevant portion of the utterance corresponds to the trigram "text to <PERSON_NAME>", the hierarchical speech recognition decoder 260 applies a language sub-model 221 for the concept <PERSON_NAME>)

In some embodiments, the language sub-models 221 are explicitly-specified, rather than trained from data. For example, the language sub-models could be specified in a Backus-Naur Form (BNF) grammar, or in a grammar specified in Speech Recognition Grammar Specification (SRGS) form. As a simplistic instance for purpose of example, the language sub-model 221 for the <PERSON_NAME> concept 205 might be specified in BNF as:
 <PERSON>::=<PERSON_FIRST><PERSON_LAST>
 <PERSON_FIRST>::=Adam|Amber|Aaron | . . .
 <PERSON_LAST>::=Adamson|Alexanderson| . . .

In some embodiments, the language sub-models 221 are statistical language models trained from an input corpus. The input corpus may be, for example, the same literal corpus 211 used to generate the parameterized corpus 212, and the possible concrete instances of the concepts 205 are identified to be those portions of the expressions that were tagged as representing concepts. For example, if the literal corpus 211 contained the expression "Send a text to John and Fred", the identifying of "John" and "Fred" as instances of <PERSON_NAME> by the concept tagging module 206, then the literal values "John" and "Fred" are incorporated into the language sub-model 221 for <PERSON_NAME>.

In some embodiments, the various possible values of the language sub-models 221 are weighted, so as to indicate which values are more probable instances of the corresponding concept 205. The weightings may be determined in different ways. For example, in some embodiments the weightings are calculated based on frequency of occurrence of the different values (e.g., the name "John" receiving a higher weighting as a <PERSON_NAME> value than "Constantine" based on its greater frequency of occurrence within the literal corpus 211). In some embodiments, the weights are obtained from other sources, such as popularity ratings listed on web sites, sales counts (e.g., in the case of the <SONG> concept), or address books (e.g., in the case of the <PERSON_NAME> concept). In some embodiments, the weightings are the same for all users; in others, the weightings are personalized to specific users based on information of those specific users (e.g., the weightings for the various <PERSON_NAME> instances being derived for a particular user at least in part from the electronic address book(s) of that particular user). In embodiments in which the weightings (and hence the language sub-models 221 of those weightings) are personalized to specific users, when a user issues an utterance, the speech interpretation module 102 may receive or otherwise determine an identifier of the user along with the utterance so that the speech interpretation module select the appropriate personalized language sub-models to use when interpreting the utterance.

The separation of the language sub-models 221 from the parameterized statistical model 222 provides a number of benefits that improve the functioning of the computer implementing the speech interpretation module 102 (e.g., the voice server 100). First, the separation reduces the size of the literal corpus needed for training. Returning to the example utterance "Send a text to John and Fred", learning to recognize other variants of the basic command, such as "Send a text to Susan and Bob", "Send a text to Frances Sanchez and Josephine O'Callaghan", etc., would require the literal corpus 211 to include instances of the many different possible names within the context of a command to send a text. In contrast, decoupling the command to send a text from the possible names to which to send it allows the literal corpus 211 to contain significantly fewer expressions, provided that a language sub-model 221 for names can be obtained.

Second, the separation provides more fine-grained interpretation of concepts 205 within utterances. The interpretation of the language sub-models 221 is at least partially independent of the parameterized statistical model 222, rather than literal tokens recognizable by the language sub-models having to be directly embedded within n-grams of a statistical model. Thus, a particular language sub-model 221 can better weight its possible recognizable tokens, thereby improving recognition accuracy, than when the tokens are mingled with a general statistical language model. This helps to mitigate the problem of sparsity of example expressions in the literal corpus 211. For example, with a general statistical language model, the expression "Call Heinrich Ofterdingen" from the literal corpus 211 would not lead to improving name-recognition ability for sending a text to a person, and since the name "Heinrich Ofterdingen" is rare, the literal corpus is unlikely to also contain the expression "send a text to Heinrich Ofterdingen". Thus, a general statistical language model would be relatively unlikely to be able to correctly interpret the expression "send a text to Heinrich Ofterdingen". In contrast, the separation of the language sub-models 221 from the parameterized statistical model 222 means that during the training phase, the expression "Call Heinrich Ofterdingen" would allow better recognition of names, in general, by providing another instance of a valid name (e.g., <PERSON_NAME>), and this knowledge could be leveraged in other context in which there are names, such as the expression "Send a text to Heinrich Ofterdingen". The example will also provide another instance of the top level parameterized corpus 212 of the utterance "Call <PERSON_NAME>"

Third, the separation improves computational efficiency by allowing run-time incorporation of the language sub-models. That is, the language sub-models 221 can be rapidly compiled as part of the processing of a speech recognition query itself. In contrast, combining the language sub-models 221 with the parameterized statistical language model, into a single non-hierarchical, fully-expanded language model would require considerable time and would require large amounts of storage to cache and use the result.

Figure 3A:
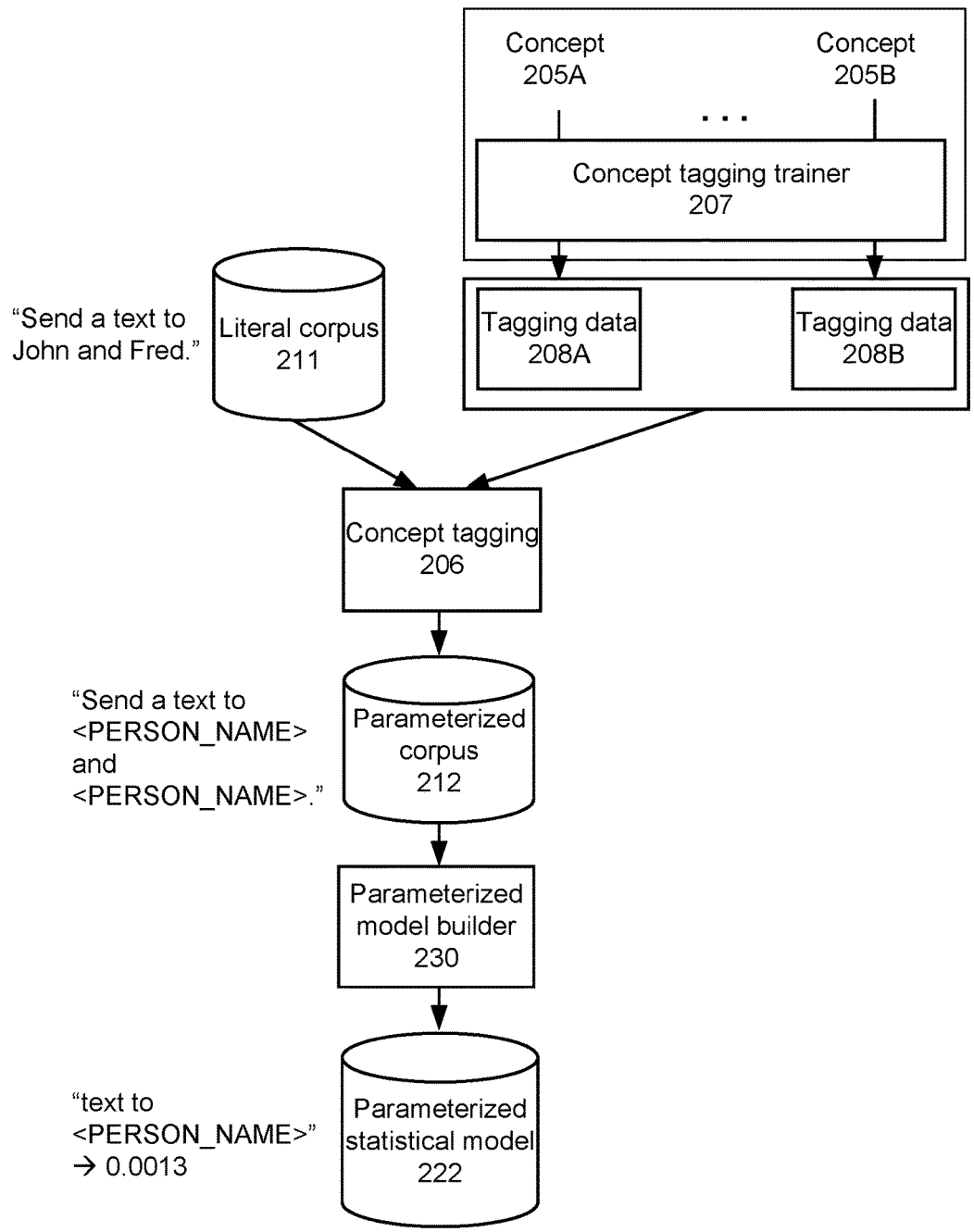
FIG. 3A is a data flow diagram illustrating how the various components of the speech interpretation module are used during a training phase when generating the parameterized model, according to one embodiment.

FIG. 3A is a data flow diagram illustrating how the various components of the speech interpretation module 102 are used during a training phase when generating the parameterized model 222, according to one embodiment. The speech interpretation module 102 stores (or accesses the remotely-stored) literal corpus 211, containing expressions such as "Send a text to John and Fred".

The concept tagging module 206 takes the literal corpus 211 as input, producing the parameterized corpus 212 containing expressions such as "Send a text to <PERSON> and <PERSON>", where the placeholders indicate the concept <PERSON>. The parameterized corpus 212 may also contain purely literal expressions, such as the original expression "Send a text to John and Fred".

In some embodiments, a concept tagging trainer module 207 is used to generate tagging data 208 that the concept tagging module 206 uses to identify portions of the expressions in the literal corpus 211 that should be replaced with placeholders.

The parameterized model builder 230 in turn analyzes the parameterized corpus 212 to produce the parameterized statistical model 222, which quantifies probabilities that various components of a phrase—including placeholder components indicating concepts 205, as well as literal components—will occur in an n-gram sequence.

Figure 3B:
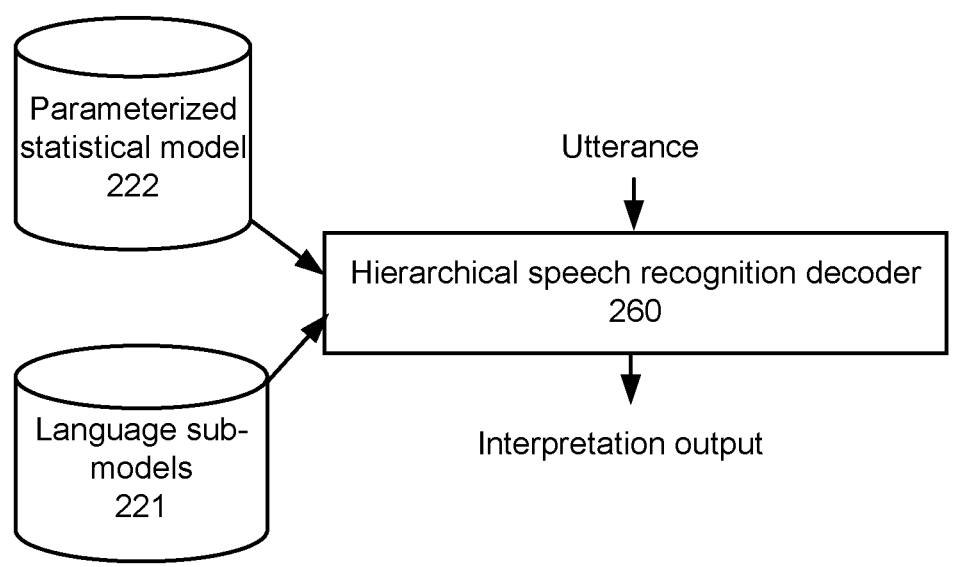
FIG. 3B is a data flow diagram illustrating how the various components of the speech interpretation module are used in a runtime phase when an utterance is received from a user and interpreted, according to one embodiment.

FIG. 3B is a data flow diagram illustrating how the various components of the speech interpretation module 102 are used in a runtime phase when an utterance is received from a user and interpreted, according to one embodiment.

An utterance is received by the speech interpretation module 102 (e.g., directly by a user asking a question or providing a command, or indirectly from a third party system that the user is using and that requires an interpretation of the user's utterance).

The utterance is provided to the hierarchical speech recognition decoder 260, which uses the parameterized statistical model 222 to drive the interpretation of the utterance. When it needs to determine whether a particular concept 205 occurs within the utterance—i.e., when the parameterized statistical model 222 has a relevant n-gram containing that concept—the hierarchical speech recognition decoder 260 also uses the language sub-model 221 for the concept to attempt to match the concept at the current point within the utterance being interpreted. When the interpretation is complete, the hierarchical speech recognition decoder 260 produces interpretation output, such as a single most probable phrase, a set of phrases and their corresponding probability scores, a lattice of phrase components, or the like.

It is appreciated that the training phase of FIG. 3A and the runtime phase of FIG. 3B need not occur only once each, one following the other. Rather, the training phase of FIG. 3A may occur any number of times, and in one embodiment is performed periodically to account for changes in expressions in the literal corpus 211, or the addition of new concepts 205 to be recognized. Similarly, the runtime phase of FIG. 3B occurs each time an utterance is received for interpretation.

Figure 4:
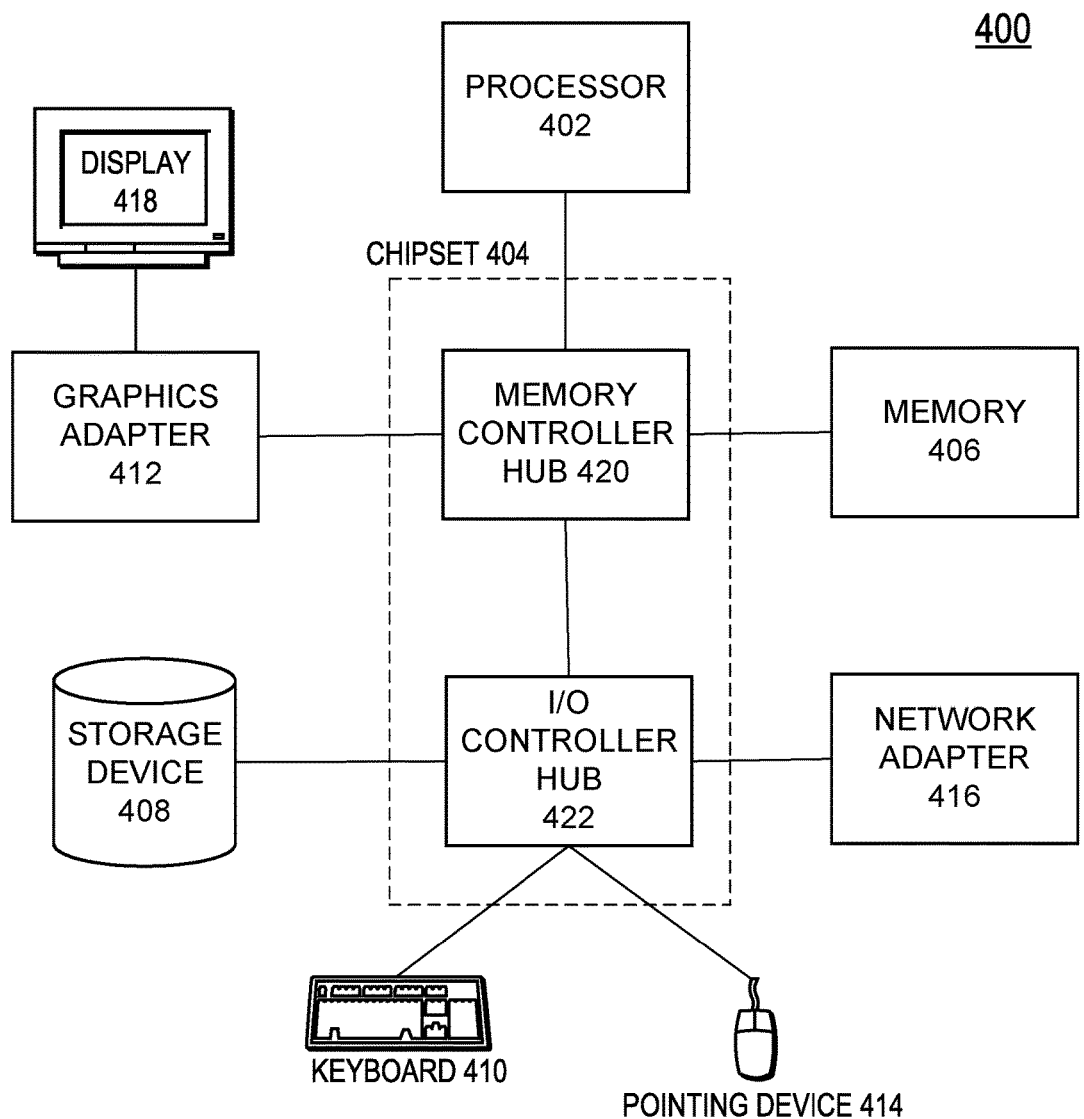
FIG. 4 is a high-level block diagram illustrating physical components of a computer used as part or all of the voice server, client device, or system hosting the third-party application from FIG. 1, according to one embodiment.

FIG. 4 is a high-level block diagram illustrating physical components of a computer 400 used as part or all of the voice server 100, client device 120, or system hosting the third-party application 130 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method, comprising:
   receiving, over a computer network, an utterance of a user, the utterance having been accepted from the user at a client device as spoken input;
   storing the utterance, the storing comprising identifying a plurality of sub-expressions by applying a parameterized statistical model that determines likely n-grams of literal word tokens and concept placeholders included in the utterance and storing each of the sub-expressions in the data structure as either: a set of literal word tokens representing the sub-expression, or a concept placeholder representing the sub-expression and providing an indication of a language sub-model;
   determining likely textual representations of the sub-expressions stored as concept placeholders by applying the indicated language sub-models to the sub-expressions;
   generating a user-specific textual interpretation of the utterance, the textual interpretation being a combination of the literal word tokens and the determined likely textual representations of the sub-expressions.

2. The computer-implemented method of claim 1, wherein applying a language sub-model to a sub-expression to determine a likely textual representation of the sub-expression comprises:
   identifying one or more additional language sub-models to apply to portions of the sub-expression;
   accessing the one or more additional language sub-models; and
   applying the accessed additional language sub-models to the associated portions of the sub-expression to determine likely textual representations of the portions of the sub-expression.

3. The computer-implemented method of claim 1, wherein applying the indicated language sub-model comprises compiling the indicated language sub-model at runtime.

4. The computer-implemented method of claim 1, wherein a language sub-model is explicitly specified based on rules of a logical grammar.

5. The computer-implemented method of claim 1, wherein a language sub-model is a statistical language model trained from an input corpus.

6. The computer-implemented method of claim 5, wherein the input corpus is a parameterized speech recognition corpus.

7. The computer-implemented method of claim 5, wherein a likely textual representation of the sub-expression is selected by the statistical language model from a set of possible textual representations based on a likelihood of each textual representation being a correct textual interpretation of the sub-expression, wherein each of the possible textual representations in the set includes a weighted value, the weighted values indicating relative probabilities that the possible textual representations will appear in a user utterance.

8. A non-transitory computer-readable storage medium storing computer program instructions executable by a processor to perform operations comprising:
   receiving, over a computer network, an utterance of a user, the utterance having been accepted from the user at a client device as spoken input;
   storing the utterance, the storing comprising identifying a plurality of sub-expressions by applying a parameterized statistical model that determines likely n-grams of literal word tokens and concept placeholders included in the utterance and storing each of the sub-expressions in the data structure as either: a set of literal word tokens representing the sub-expression, or a concept placeholder representing the sub-expression and providing an indication of a language sub-model;
   determining likely textual representations of the sub-expressions stored as concept placeholders by applying the indicated language sub-models to the sub-expressions;
   generating a user-specific textual interpretation of the utterance, the textual interpretation being a combination of the literal word tokens and the determined likely textual representations of the sub-expressions.

9. The non-transitory computer-readable storage medium of claim 8, wherein applying a language sub-model to a sub-expression to determine a likely textual representation of the sub-expression comprises:
   identifying one or more additional language sub-models to apply to portions of the sub-expression;
   accessing the one or more additional language sub-models; and
   applying the accessed additional language sub-models to the associated portions of the sub-expression to determine likely textual representations of the portions of the sub-expression.

10. The non-transitory computer-readable storage medium of claim 8, wherein applying the indicated language sub-model comprises compiling the indicated language sub-model at runtime.

11. The non-transitory computer-readable storage medium of claim 8, wherein a language sub-model is explicitly specified based on rules of a logical grammar.

12. The non-transitory computer-readable storage medium of claim 8, wherein a language sub-model is a statistical language model trained from an input corpus.

13. The non-transitory computer-readable storage medium of claim 12, wherein the input corpus is a parameterized speech recognition corpus.

14. The non-transitory computer-readable storage medium of claim 12, wherein a likely textual representation of the sub-expression is selected by the statistical language model from a set of possible textual representations based on a likelihood of each textual representation being a correct textual interpretation of the sub-expression, wherein each of the possible textual representations in the set includes a weighted value, the weighted values indicating relative probabilities that the possible textual representations will appear in a user utterance.

15. A system comprising:
a processor for executing computer program instructions; and
a non-transitory computer-readable storage medium storing computer program instructions executable by the processor to perform operations comprising:
receiving, over a computer network, an utterance of a user, the utterance having been accepted from the user at a client device as spoken input;
storing the utterance, the storing comprising identifying a plurality of sub-expressions by applying a parameterized statistical model that determines likely n-grams of literal word tokens and concept placeholders included in the utterance and storing each of the sub-expressions in the data structure as either: a set of literal word tokens representing the sub-expression, or a concept placeholder representing the sub-expression and providing an indication of a language sub-model;
determining likely textual representations of the sub-expressions stored as concept placeholders by applying the indicated language sub-models to the sub-expressions;
generating a user-specific textual interpretation of the utterance, the textual interpretation being a combination of the literal word tokens and the determined likely textual representations of the sub-expressions.

16. The system of claim 15, wherein applying a language sub-model to a sub-expression to determine a likely textual representation of the sub-expression comprises:
identifying one or more additional language sub-models to apply to portions of the sub-expression;
accessing the one or more additional language sub-models; and
applying the accessed additional language sub-models to the associated portions of the sub-expression to determine likely textual representations of the portions of the sub-expression.

17. The system of claim 15, wherein applying the indicated language sub-model comprises compiling the indicated language sub-model at runtime.

18. The system of claim 15, wherein a language sub-model is explicitly specified based on rules of a logical grammar.

19. The system of claim 15, wherein a language sub-model is a statistical language model trained from an input corpus.

20. The computer-implemented method of claim 19, wherein a likely textual representation of the sub-expression is selected by the statistical language model from a set of possible textual representations based on a likelihood of each textual representation being a correct textual interpretation of the sub-expression, wherein each of the possible textual representations in the set includes a weighted value, the weighted values indicating relative probabilities that the possible textual representations will appear in a user utterance.

* * * * *